(12) United States Patent
Niekerk et al.

(10) Patent No.: US 7,537,792 B2
(45) Date of Patent: May 26, 2009

(54) HIGH SPEED COATING OF GUM CORES

(75) Inventors: Miles Van Niekerk, Madison, NJ (US); Francois Pierre Errandonea, Hopatcong, NJ (US); Kenneth Paul Bilka, Floral Park, NY (US)

(73) Assignee: Cadbury Adams USA LLC, Parsippany, NJ (US)

( * ) Notice: Subject to any disclaimer, the term of this patent is extended or adjusted under 35 U.S.C. 154(b) by 0 days.

(21) Appl. No.: 10/011,904

(22) Filed: Dec. 4, 2001

(65) Prior Publication Data
US 2002/0086092 A1    Jul. 4, 2002

Related U.S. Application Data

(63) Continuation-in-part of application No. 09/374,935, filed on Aug. 16, 1999, now Pat. No. 6,365,203.

(51) Int. Cl.
*A23G 4/00* (2006.01)

(52) U.S. Cl. .......................... 426/5; 426/291; 426/293; 426/295; 426/302; 426/303; 426/304; 426/305

(58) Field of Classification Search ..................... 426/5, 426/291, 293, 295, 302–305
See application file for complete search history.

(56) References Cited

U.S. PATENT DOCUMENTS

| | | | |
|---|---|---|---|
| 3,085,914 A | | 4/1963 | Wadsworth et al. |
| 4,238,510 A | * | 12/1980 | Cherukuri et al. ............... 426/5 |
| 4,250,195 A | * | 2/1981 | Cherukuri et al. ............... 426/5 |
| 4,317,838 A | | 3/1982 | Cherukuri et al. |
| 4,499,113 A | | 2/1985 | Mochizuki et al. |
| 4,563,363 A | | 1/1986 | Yoon |
| 5,270,061 A | | 12/1993 | Reed et al. |
| 5,376,389 A | | 12/1994 | Reed et al. |
| 5,495,418 A | | 2/1996 | Latini et al. |
| 5,536,511 A | | 7/1996 | Yatka |
| 5,545,417 A | | 8/1996 | Richey et al. |
| 5,603,970 A | | 2/1997 | Typrin et al. |
| 5,665,406 A | | 9/1997 | Reed et al. |
| 5,716,652 A | | 2/1998 | Barkalow et al. |
| 5,965,181 A | | 10/1999 | Barkalow et al. |
| 5,980,955 A | | 11/1999 | Greenberg et al. |
| 6,190,705 B1 | | 2/2001 | Richey |
| 6,290,985 B2 | | 9/2001 | Ream et al. |
| 6,332,806 B1 | | 11/2001 | Ream et al. |
| 6,365,203 B2 | | 4/2002 | Degady et al. |
| 2002/0009517 A1 | | 1/2002 | Degady et al. |
| 2002/0086091 A1 | | 7/2002 | Degady et al. |
| 2002/0086092 A1 | | 7/2002 | Niekerk et al. |
| 2002/0090417 A1 | | 7/2002 | Degady et al. |

FOREIGN PATENT DOCUMENTS

| | | |
|---|---|---|
| AU | 716114 | 5/1997 |
| EP | 0 473 478 | 4/1992 |
| EP | 0 348 103 | 5/1994 |
| WO | WO 01/11984 | 2/2001 |

OTHER PUBLICATIONS

Zhuravleva et al., "Technology of confectionery production", Moscow, 1968, p. 252—partial translation. Ageev, "Sugar product techniques", 1961, pp. 410-411, pp. 478-781—partial translation. Rapoport "Confectionery production", Moscow, 1940, p. 540—partial translation.
Dragilev & Lurie "Confectionery production", p. 421, second paragraph, Moscow, DeLi print, 2001—partial translation. Dragee Formulations, 1973, p. 22—no translation.
"Sucrose Hard Panning", J. Bogusz, The Manufacturing Confectioner, Aug. 2004 pp. 39-46.
"Sugarless PAnning Procedures and Techniques", R. F. Boutin, The Manufacturing Confectioner.
Josef A. Meri, et al., "Silesia Confiseria Manual No. 4 - Reference Book for the Manufacture of Panned Goods aand the Surface Treatment of Snack Products", p. 109, Silesia Gerhard Hanke (1996).
E. B. Jackson (Ed.), "Sugar Confectionary Manufacture", pp. 247-257, Blackie 7 sons, Ltd. (1990).
Robert D. Walter, "Panning - The Specialist's Specialty, Part 1", Candy and Snack Industry, (1974).
Robert D. Walter, "Panning - The Specialist's Speciality - Part 2", Candy & Snack Industry (Jan. 1975).

(Continued)

*Primary Examiner*—D. Lawrence Tarazano
*Assistant Examiner*—Nikki H Dees
(74) *Attorney, Agent, or Firm*—Watov & Kipnes, P.C.

(57) ABSTRACT

A system and process for coating pieces or cores of confectionery material, such as chewing gum, with a sugar-based coating or a sugarless-based coating. The solid content of the sugar or sugarless material in the syrup solution is increased, thus reducing the water content and allowing the successive coating layers to be dried more quickly. The syrup solution is maintained at an elevated temperature in order to prevent the syrup solids from precipitating or crystallizing out of solution.

16 Claims, 4 Drawing Sheets

OTHER PUBLICATIONS

Dr. Richard W. Hartel, "Crystallisation and Drying During Hard Panning", The Manufacturing Confectioner, (Feb. 1995).

"Hard Panning with Xylitol" leaflet by Roquette America, Inc. (date unknown).

Walter Vink, "Sugar Crystals - An Introduction", a paper presented at 55th PMCA Production Conference in 2001, Proceddings of the 55th Annual Production Conference of the Pennsylvania Manufacturing Confectioner's Association.

M. Patricia Mageean, et al, "Physical Properties of Sugars and their Solutions", pp. 171-172, Scientific and Technical Surveys of the British Food Manufacturing Inductries REsearch Association (Aug. 1991).

* cited by examiner

FIG. 1

Sugar I

| Step | Repetitions | Spray vol. (liters) | Spread time (seconds) | Dry time (seconds) | Air temp (°C) | Syrup Conc. (Brix) | Rpm |
|---|---|---|---|---|---|---|---|
| 1 | 2 | 1.4 | 0 | 120 | 30 | 82 | 8 |
| 2 | 3 | 2.0 | 0 | 150 | 30 | 82 | 8 |
| 3 | 5 | 3.5 | 30 | 150 | 30 | 82 | 8 |
| 4 | 14 | 3.5 | 60 | 180 | 30 | 82 | 8 |
| 5 | 3 | 3.5 | 60 | 180 | 30 | 74 | 8 |
| 6 | 5 | 2.0 | 90 | 210 | 30 | 74 | 8 |
| 7 | 5 | 1.0 | 90 | 150 | 30 | 74 | 5 |

FIG. 3

Sugar II

| Step | Repetitions | Spray vol. (liters) | Spread time (seconds) | Dry time (seconds) | Air temp (°C) | Syrup Conc. (Brix) | Rpm |
|---|---|---|---|---|---|---|---|
| 1 | 2 | 1.4 | 0 | 120 | 30 | 82 | 6 |
| 2 | 3 | 2.0 | 0 | 150 | 30 | 82 | 6 |
| 3 | 9 | 3.5 | 60 | 240 | 30 | 82 | 6 |
| 4 | 6 | 3.5 | 60 | 240 | 30 | 80 | 6 |
| 5 | 8 | 2.0 | 90 | 180 | 30 | 74 | 6 |
| 6 | 5 | 1.0 | 90 | 180 | 30 | 74 | 6 |

Sugarless (Maltitol) I

| Step | Repetitions | Spray vol. (liters) | Spread time (min.) | Powder wt (g) | Dry time (min.) | Air temp (°C) | Rpm | Syrup Conc. (Brix) |
|---|---|---|---|---|---|---|---|---|
| 1 | 3 | 0.4 | 0.5 | 500 | 5.0 | 22 | 6 | 72 |
| 2 | 2 | 0.7 | 0.5 | 200 | 5.0 | 24 | 6 | 72 |
| 3 | 2 | 1.0 | 0.5 | | 5.0 | 24 | 6 | 72 |
| 4 | 1 | 1.3 | 0.75 | | 6.0 | 24 | 6 | 72 |
| 5 | 4 | 1.3 | 0.75 | | 7.0 | 24 | 6 | 72 |
| 6 | 5 | 1.5 | 1.5 | | 5.5 | 24 | 6 | 72 |
| 7 | 4 | 1.5 | 2.0 | | 3.5 | 23 | 6 | 72 |
| 8 | 3 | 1.5 | 2.5 | | 3.0 | 23 | 6 | 70 |
| 9 | 3 | 1.5 | 2.5 | | 2.5 | 23 | 6 | 70 |
| 10 | 3 | 1.5 | 2.5 | Flavor added at | 3.0 | 23 | 6 | 70 |
| 11 | 1 | 1.5 | 2.5 | start of stage 10 | 2.5 | 23 | 6 | 70 |
| 12 | 1 | 1.5 | 2.5 | | 3.5 | 23 | 6 | 70 |
| 13 | 2 | 1.5 | 2.5 | | 2.5 | 23 | 6 | 70 |
| 14 | 2 | 1.0 | 1.5 | | 4.0 | 20 | 6 | 70 |
| 15 | 2 | 0.7 | 1.5 | | 5.0 | 20 | 6 | 70 |
| 16 | 1 | 0.7 | 1.5 | | 6.0 | 20 | 6 | 70 |
| 17 | 1 | 0.7 | 1.5 | | 7.0 | 20 | 6 | 69 |
| 18 | 2 | 0.4 | 1.0 | | 7.0 | 20 | 6 | 68 |
| 19 | 1 | 0.0 | 0.0 | 500 wax | 25.0 | 32 | jog | 68 |
| 20 | 1 | 0.0 | 0.0 | | 20.0 | 32 | 6 | |

FIG. 6

HIGH SPEED COATING OF GUM CORES

CROSS-REFERENCE TO RELATED APPLICATION

This application is a continuation-in-part of U.S. application Ser. No. 09/374,935 entitled "Continuous Coating Of Chewing Gum Materials" filed on Aug. 16, 1999, now U.S. Pat. No. 6,365,203 issued on Apr. 2, 2002, and incorporated by reference herein.

TECHNICAL FIELD

The present invention relates to confectionery products that have an outer shell or coating, and more particularly to processes for coating pieces or cores of a confectionary product, such as gum, with sugar based and sugarless materials.

BACKGROUND OF THE INVENTION

The present invention relates generally to confectionery products. More specifically, the present invention relates to confectionery products that have an outer shell or coating, syrups for creating the outer coatings, and processes for coating the products with the syrups and forming hard outer shells.

A wide variety of types of coated confectionery products are known today. These confectionery products include chewing gum and bubble gum. The gum products generally consist of the water insoluble and a water soluble portion including sweeteners. In a similar vain, it is known to provide a wide variety of different types of chewing gum and bubble gum (hereinafter both generally referred to as "gum" or "chewing gum"). For example, it is also known in creating gum and other confectionery products, to coat the product with an outer or over-coating. The sugar based or sugarless coating can provide an initial sweetness or other desirable property to the consumer, a crunching sensation when chewed by the consumer, and a smooth outer appearance to the product. A number of such chewing gum products are known, such as, for example, the "Chiclets" brand and "Dentyne Ice" brand products.

For coated chewing gums, initially sugar syrups were used to create the coatings or shells. The sugar syrups typically created a product having a smooth appearance, and provided a coating with a crunching sensation to the consumer, as well as an initial burst of sweetness. In recent years, other types of syrups have been utilized for coating gum, such as sugarless syrups.

The coating of pieces or cores of chewing gum is a long and laborious process, involving numerous steps. In order to provide a smooth and thick outer coating, the cores can be subjected to fifty or more separate coating steps. Each of the coating steps includes spraying a syrup material on the cores, tumbling or rotating the cores in an appropriate mechanism, and drying each of the successive coatings with hot air or the like. Often, powdered coatings are utilized to build up an initial coating on the cores, followed by liquid coatings in order to even out and smooth the outer surface. Known coating processes can take up to five to six hours or more in order to produce satisfactory coated chewing gum products.

It would be desirable to improve the coating process and ultimate coated products, as well as increase the speed of the coating process, particularly for chewing gum products. Increasing the speed of the coating process, or increasing the coating capacity, would create a higher throughput of coated products resulting in lower manufacturing and labor costs and increased profits to the manufacturer.

SUMMARY OF THE INVENTION

It is an object of the present invention to provide an improved confectionery product, such as a coated chewing gum product. It is another object of the present invention to improve the coating process for coated chewing gum products.

It is a further object of the present invention to provide a coating process which increases the speed of the total coating process. It is still another object of the present invention to provide a coated chewing gum product of the same quality as existing coated chewing gum products, but one that can be produced in a faster and more efficient manner.

The present invention provides an improved coated confectionery product and process. In particular, the solid content in the syrup used to coat the pieces and cores is increased. This reduces the liquid content of the syrup material and reduces the time necessary to dry the coating. The syrups with increased solid content are kept at an elevated temperature in order to prevent the solids from percipitating or crystallizing out of solution prior to being sprayed on the pieces or cores. The holding tanks or containers in which the syrup is stored are heated, such as by heated water jackets or electrical heating systems. In addition, the conduits or lines in which the syrup is transported from the holding tanks to the coating site are also heated in a similar manner.

The present invention applies to coatings of both sugar based and sugarless materials. The present invention provides a process which is faster, less expensive, and more efficient than known processes and yet produces a high quality coated product the same as existing coating products.

In alternative embodiments, the drying times, air temperature used for drying the coatings, and the syrup concentrations are changed during the coating process. These parameters can be changed for each step or each series of steps during the process. By regulating these parameters, improved quality coated products can be produced.

Other benefits, features, and advantages of the present invention will become apparent from the following description of the invention, when viewed in accordance with the appended claims and accompanying drawings.

DESCRIPTION OF THE PREFERRED EMBODIMENT(S)

The present invention provides improved overcoated or coated confectionery products, as well as improved methods for coating the products. Although, in the preferred embodiment set forth below, the confectionery product is a chewing gum, or bubble gum product, the present invention is not limited to gum products. The present invention can be used to coat or overcoat a wide variety of food and confectionery products. It is also possible to use the present invention to coat pharmaceutical products.

For convenience and ease of description, the terms "chewing gum" or simply "gum" will be used herein to refer to all types of gum products, and are not to be taken as limiting the invention to only certain types of gum products. For example, the present invention can be used in the coating processes or systems to produce all types of coated gum products, including bubble gum, sugarless gum, sugar-based chewing gum, etc.

In general, the present invention comprises increasing the solid content in the syrup material or system used to spray one or more steps of the coating process for coating the gum pieces or cores. Syrup solutions generally comprise a sugar or sugarless material dissolved in solution with water. The high solid content syrup solution is maintained at an elevated temperature in order to keep the sugar or sugarless solids form precipitating or crystallizing out of solution. With the higher solid content and heated supply system, the sprayed coatings can be dried in a faster and more efficient manner. This reduces the time of the overall coating process and creates a higher throughput, thus increasing the amount of product that can be made per unit of time. The present invention can be used for both sugar syrup solutions and sugarless syrup solutions. As to sugarless solutions, the preferred ingredient is a polyol, such as maltitol.

Figure 1:
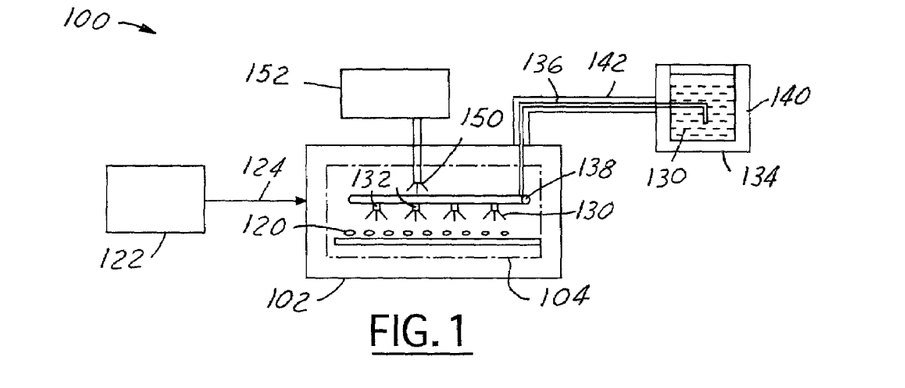
FIG. 1 is a schematic illustration of a representative system for use in accordance with the present invention.

A preferred system for use of the present invention is shown schematically in FIG. 1 and identified in general by the reference numeral 100. The system 100 includes a coating mechanism 102 (commonly called a "coating pan") in which the small pieces or cores of gum material 120 are alternately sprayed and dried until the final hard thick coating is formed. The coating mechanism 102 typically includes an internal barrel or screen-type mechanism 104 in which the cores or pieces 120 are positioned. The barrel 104 is rotated by a mechanism (not shown) of conventional type. The pieces or cores of material 120 are produced by any type of conventional process, such as a batch mixer 122. The gum material is mixed in a conventional manner, and then sized, rolled, and cut into individual pieces, or sheets of scored cores. The pieces, sheets, or cores are then conveyed by an appropriate conveying mechanism 124 and introduced into the coating pan 102. The materials could also be placed manually in the coating pan 102.

Once the pieces or cores are positioned in the coating pan, they are subjected to a repetitive series of coating steps. Each of the coating steps includes spraying a syrup-type material onto them, allowing the cores to be rotated or tumbled and spread out in the coating pan, and then drying them with heated air. In order to effectively coat chewing gum pieces or cores, the spraying, spreading, and drying steps can typically be repeated fifty or more times.

Initially, the cores can be coated with a thicker syrup composition or even coated with a dry powder coating in order to provide an initial layer of material on them. Once initial layers are formed, thinner syrup solutions are typically utilized in order to smooth out and/or develop a smoother coating on the products.

The syrup material 130 is sprayed from a series of spray nozzles 132 positioned inside the coating pan 102. The syrup material 130 is provided from a tank or a container 134 which is typically positioned adjacent to the coating pan. The syrup material 130 is transported through a pipe or conduit 136 to the header 138 and in turn to the spray nozzles 132.

In accordance with the present invention, the syrup material 130 is kept at an elevated temperature, both in the container or holding tank 134 and throughout the passageway through the conduit or pipe 136 to the coating pan. For this purpose, a heated water jacket or electrical heater-type mechanism 140 is utilized to maintain the syrup in the tank or container 134 at an elevated temperature. In addition, a heating jacket or electrical heater mechanism 142 is used to maintain the syrup material in the conduit 136 at an elevated temperature. In this regard, heated water jacket systems and electrical heating systems are known in the art and do not need any further explanation or detail here. Typically, the heated jackets are heated with hot water, although steam or heated oil could be used if the elevated temperatures created by these latter systems do not degrade the syrup material.

The drying air 150 is injected into the coating pan 102 from a heated air source 152 of conventional type and design.

There are numerous known coated chewing gum and bubble gum products. One of these products is the Chiclets brand chewing gum manufactured by Warner-Lambert Company. Traditionally, coated chewing gum and bubble gum products are produced by time-consuming and labor intensive batch-type manufacturing processes. For batch-type processes, large rotating containers are utilized to coat the gum cores or pieces. Initially, the gum material is produced by a standard extrusion or batch process and formed into large, thin sheets of material several inches or a foot or more in width. Separation lines are pressed or formed into the sheets of gum forming the shapes of the smaller pieces (also known as cores) of gum, and then the sheets are typically stored in a cooler or under a cooled atmosphere in order to condition them for further processing.

The gum material could also be produced in continuous mixers and extruded into sizers and rollers wherein the sheets of material are produced.

Once the sheets and/or cores of gum are formed, the sheets or cores are dumped or inserted into rotating mixers where they are separated and/or broken up into separate cores by a tumbling process. Thereafter, a coating solution such as a sugar syrup is added to the mixer while the mixer is rotating. Hot air at a temperature of approximately 120° F. is used to dry the coated cores.

In order to form a uniform and consistent coated gum product with a hard shell of the desired thickness, the spraying-tumbling-drying process is repeated over and over until the requisite coating is completed. In order to make an acceptable coating, this process can be repeated up to 40-50 times or more with small-thin layers being added each time. This process can take up to six to seven hours to complete and is labor-intensive.

In the same manner, it is also possible to add a wax coating to create a shinier surface on the coated gum products. The wax material is applied in the same manner as the other (syrup) material to the cores. Once all the coating and finish layers are completed, the coated pieces of gum are transferred to another station or area where they are assembled and packaged in a conventional manner. The present invention is a significant improvement over known systems for manufacturing coated confectionery products, such as chewing gum and bubble gum products.

One preferred process and system for coating cores of material is set forth in U.S. patent application Ser. No. 09/374, 935, filed on Aug. 16, 1999, and entitled "Continuous Coating of Chewing Gum Materials", and now is U.S. Pat. No. 6,365, 203 issued on Apr. 2, 2002. The disclosure of that patent application is hereby incorporated herein by reference.

Figure 2:
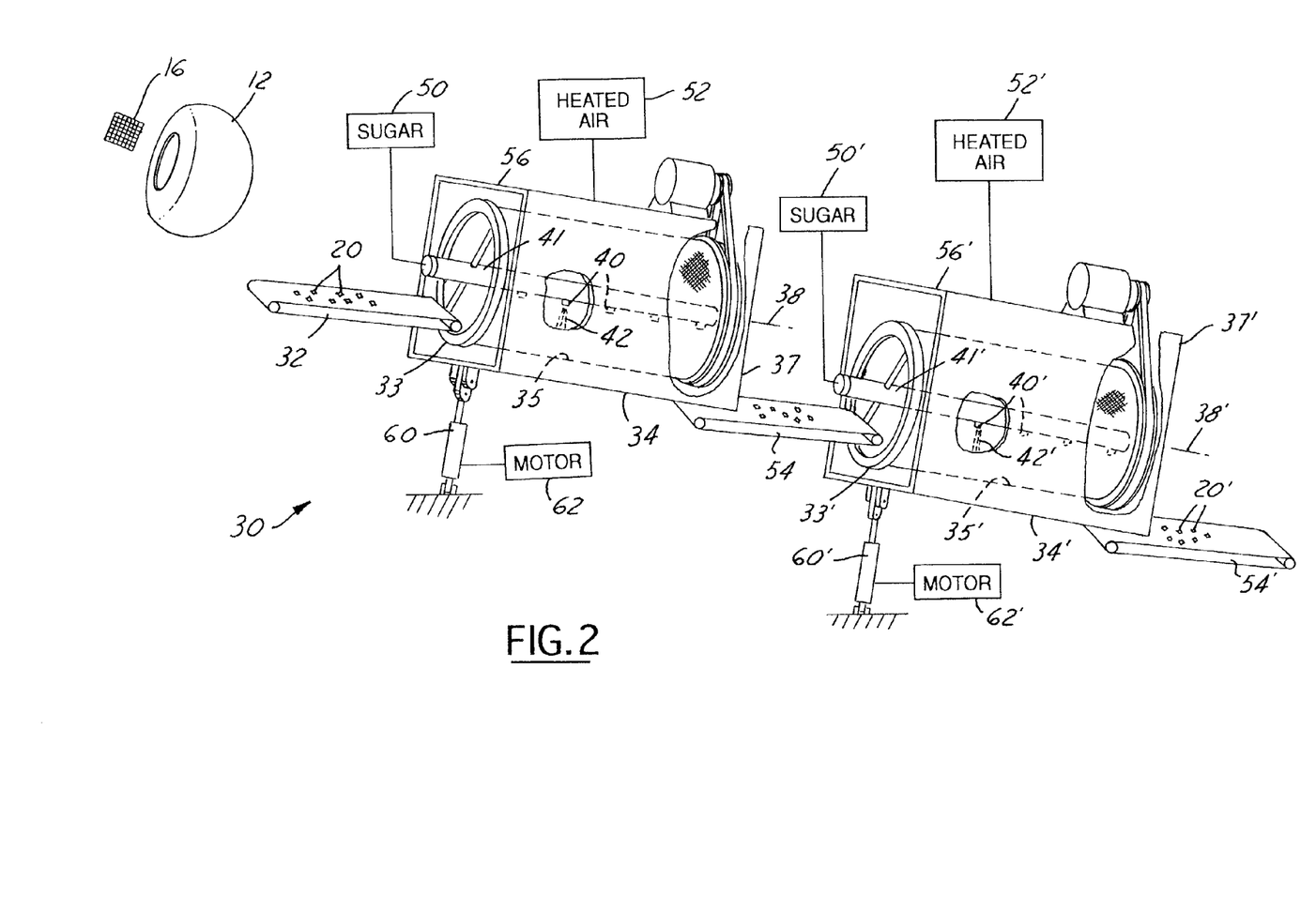
FIG. 2 illustrates an alternate representative system for use in accordance with the present invention.

As shown in FIG. 2, which depicts the general process and system 30 of patent application Ser. No. 09/374,935, sheets of gum material 16 are first placed into rotating drum or mixer 12 to tumble and break them up into individual pieces of material 20. Individual cores or pieces of material 20 are then conveyed by conveying mechanism 32 to the upstream or first end 33 of at least one rotating drum mechanism 34. In this regard, either one rotating drum mechanism 34 or a series of two or more rotating drum mechanisms 34, 34' can be utilized, as shown in FIG. 2. The number of individual drum mechanisms that are utilized in order to continuously coat the gum materials depends on a number of factors, such as the speed of the process, the thickness of the desired coating, and the quality of the finished product desired.

The drum mechanism 34 includes a frame 36 and a cylindrical drum member 35 rotatable about an axis 38 which is tilted with respect to the horizontal plane. The degree or angle of tilt also preferably is adjustable so that the length of time that the cores are in the drum member and numbers of layers of coating on each core of material can be adjusted as desired. It is also possible in accordance with the present invention to utilize only one coating pan which does not have the ability to be tilted and in which the cores of material are tumbled, sprayed, and dried. Rotating mesh-type drum members of this type are currently provided by Coating Machinery Systems, Inc., in Ames, Iowa, and Dumoulin Coating Pans in France.

In accordance with a preferred process and system of the present invention, the rotating drum member 35 can be tilted or angled relative to the horizontal so that the cores of material 20 will enter and exit from the drum member in a uniform and consecutive manner. In this regard, a "first-in, first-out" system is preferred wherein the first cores of material to enter the inlet or first end 33, 33' of the drum member 34, 34' are also the first cores of material to exit or leave the drum member. This insures that all the cores of material are treated uniformly and consistently and that the same number of layers and same thicknesses of coating will be applied to each core of gum material.

A series of spray nozzles 40 extend into the drum member 34 along its length and are used to spray a fine coating solution 42 onto the pieces or cores of gum material, which are introduced into the first rotating drum member. Preferably, the drum includes a series of angled baffles, ridges, or "rifling" (not shown) which tumble the pieces of material as they pass from the first end to the outlet or exit end of each 37, 37' of the drum members.

A coating solution, such as a sugar syrup, is introduced into the drum member from a holding tank or container 50, 50'. The coating solution preferably has a mixture of sugar and water and various small percentages of other ingredients.

Heated air is introduced into the drum members from a pressure source 52, 52' in order to dry the pieces of material 20 which are being coated with the coating solution 42, 42'. The coating material is dried on the individual pieces or cores of gum material substantially and virtually instantaneously as the solution is applied on the pieces of material. This insures an even, consistent coating and allows the buildup of numerous layers of coating material on each core.

The air can be introduced into the drum members 35, 35' in a number of different ways, but preferably is introduced through perforations in the sidewalls of the inner drum members in order to allow a substantially uniform flow of heated air throughout the interior cavity of the drum member.

When a series of rotating drum mechanism 34, 34' etc. are utilized, small conveyer mechanisms 54 or conduits are used to convey the pieces of material being coated from one drum member to the other.

The spray nozzles 40, 40' are fixed inside the drums and do not rotate with them. The spray nozzles 40, 40' are positioned along one or more pipes or conduits 41, 41' which extend along the inside of the rotating drum members 35, 35'.

The drum members preferably tilt or incline with respect to a horizontal plane a few degrees, such as 1-5 degrees. It is also preferable to have an adjustable mechanism (not shown) which can change the tilt or angle of the tilt of the drum members. A change in the angle of the drum members affects the speed by which the products are passed through them. Thus, it is possible to speed up or slow down the coating process as desired in order to change the thickness and/or quality of the coating.

The walls of the rotating drum members 35, 35' are preferably made from a screen or mesh so that the heated air can easily pass through them. The spray nozzles 40 extend in a series longitudinally within the drum member 35.

The system used for drying the material in drum members 35, 35' preferably includes a stationary shroud or frame 56, 56' which extends around a portion of the inner drum members. Air is introduced into the frame or shroud through an inlet and connected to a source of air 52, 52'. This source of air can be any conventional type, such as a blower (not shown). Also, the air is heated by a heating mechanism of conventional type (not shown) such that the heated air is introduced into the drum member through its perforated or meshed side walls.

The air is also continuously exhausted from the drum members 35, 35' in order to continuously supply new heated air to the interior of the drum member and thus dry the coating solution on the pieces of material instantaneously.

The drum members are rotated at a relatively constant rpm, such as 5-35 rpm, depending on the desired flow rate of the material and coating solution. As the drum members rotate, the flanges, ridges, or flightings inside the drum carry the pieces of material around the perimeter of the drum member and allow it to fall or tumble around inside the drum member. In this manner, a curtain of material spaced apart from the side walls of the drum member is produced.

A computer micro-processor is preferable utilized for controlling the operation of the continuous coating system or apparatus 30. For example, the computer can be utilized to control electrical power to the apparatus, the tilting angle of the drum members, the rotational speed of the drum members, the spraying functions of the nozzles, and the air flow and temperature in the drying system.

While the present invention can be used either to make sugar-type confectionery products, or sugarless confectionery products, for sugar coated gum products, such as Chiclets brand products, the sugar syrup has approximately 70% sugar solids and 30% water. Traditionally, the amount of solid content in a sugar or sugarless solution is referred to by the "Brix" standard. For sugar-type coatings known today, the Brix content is typically in the range of 75-78. In accordance with the present invention, however, the percentage of sugar solids in the solution has been increased to approximately 80-84 Brix.

In known sugarless-type coating systems, the amount of sugarless solids in the syrup solution is typically on the order of 66-70 Brix. In accordance with the present invention, the Brix content has been increased to approximately 70-74 Brix. In the examples set forth below, the sugarless-type material utilized is maltitol. However, it is understood that any conventional sugarless-type material can be used, such as the polyols, which include xylitol, mannitol, erythritol, lactitol, palatinit, and sorbitol, as well as maltitol.

The coating on the confectionery or gum cores is preferably about 20-40% by weight of the final product. Preferably, the coating is in the range of 30-35% by weight. Coatings in this range provide the desired crunchiness of the product, as well as give it a smooth and pleasing appearance. These standards are the same whether the coating is a sugar material or a sugarless material.

Also, whether the coating is a sugar or sugarless material, it is preferred to apply a wax coating as the final step. The wax can comprise approximately 0.1%-0.5% of the total coating weight and is used to polish the finished pellets, provide a smoother surface, and provide a more pleasing appearance. Preferred wax materials for the final wax coatings are carnauba wax and candelilla wax.

Figure 3:
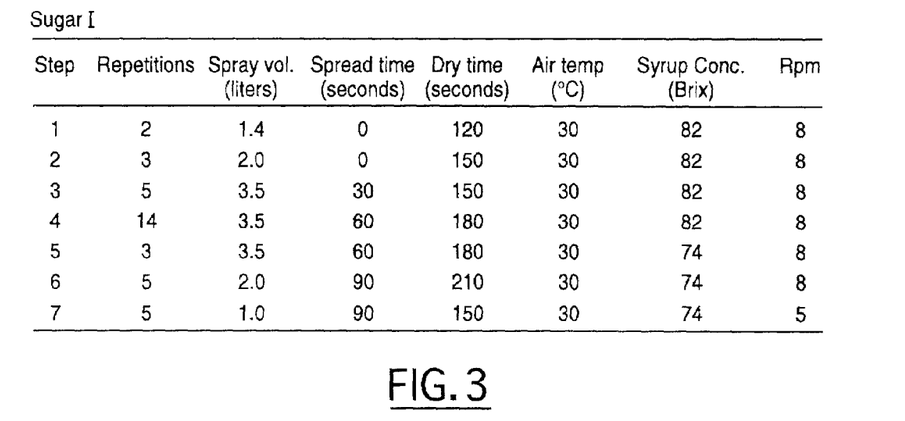
FIGS. 3 and 4 are charts or tables evidencing examples of systems using embodiments of the present invention with sugar-based syrups.
Figure 4:
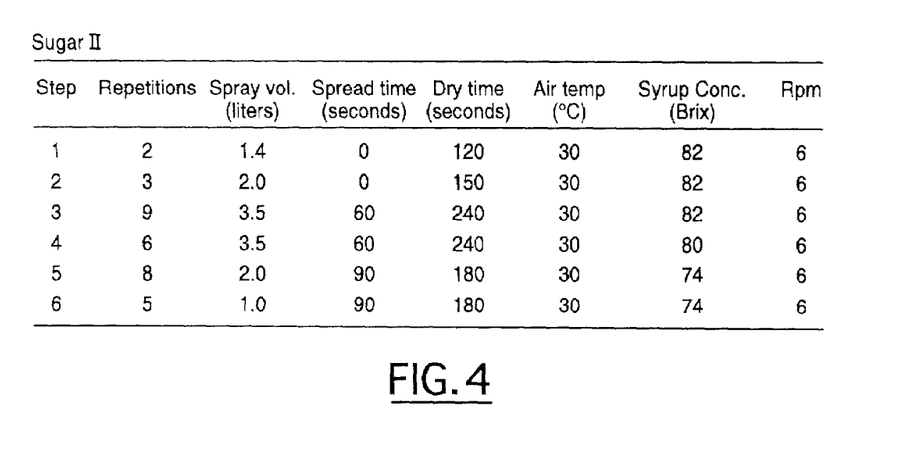

The two charts or tables shown in FIGS. 3 and 4 comprise two examples that were conducted in accordance with the present invention in which sugar was used as the coating. The cores were approximately 150 kilograms in weight, and the syrup concentration was 82 and 80 Brix for the bulk coating and 74 Brix for the finish coating. The coating pan was a Dumoulin IDA 500X. The sugar syrup was kept in a batch container at approximately 80° C. In this regard, in accordance with the present invention, it is preferable to keep the sugar or sugarless syrup at a temperature between 75-100° C. It is also important to keep the temperature below the temperature at which the material could degrade. In both examples, the cores were inserted in sheets into the Dumoulin coating pan, and the pan was rotated in order to tumble and break up the sheets into individual cores.

In sugar example I, as set forth in FIG. 3, the first step involved two repetitions in which 1.4 liters of sugar spray was sprayed onto the cores and the drying time was 120 seconds. The air temperature was 30° C., and the syrup concentration was 82 Brix. The speed of rotation of the coating pan was 8 rpm (revolutions per minute). The term "spread time" refers to the amount of time that the cores are rotated in the pan after the sugar is sprayed on them and before the air is turned on to dry them. The spread time allows friction between of the cores as they are tumbling to spread out the syrup evenly on the surfaces and over the preceding layer. This provides a full and even coating of the syrup on the cores. For example, in step 3, which involves five repetition steps, 3.5 liters of sugar solution was sprayed onto the cores and the cores were allowed to rotate for 30 seconds before the drying air was turned on and injected into the coating pan. The drying time was 150 seconds, and the air temperature was 30° C. The drying time was increased in steps 4 and 5 to 180 seconds in order to produce a dryer shell.

In steps 5-7, a finishing coat of a thinner syrup concentration, namely 74 Brix, was utilized in order to smooth out any roughness that might have been present on the cores from the heavier syrup concentrations in steps 1-4. Once the cores had the requisite amount of syrup coated on them, they were conditioned overnight and then subjected to the final wax coating. (In the alternative, the wax coating could have been applied immediately after steps 1-7, if desired, and if the shells were sufficiently dry.)

In sugar example II, as set forth in FIG. 4, the sugar concentration was reduced from 82 Brix to 80 Brix in step 4. Otherwise, the coating process was similar to that described in sugar example I (FIG. 3). The reduction in syrup concentration from 82 to 80 Brix was thought to improve the hardness (crunch) of the resulting coating shell, but there was no perceived difference in the coating-shell hardness from either of the batches, and both were sufficiently dried to be polished immediately.

Figure 5:
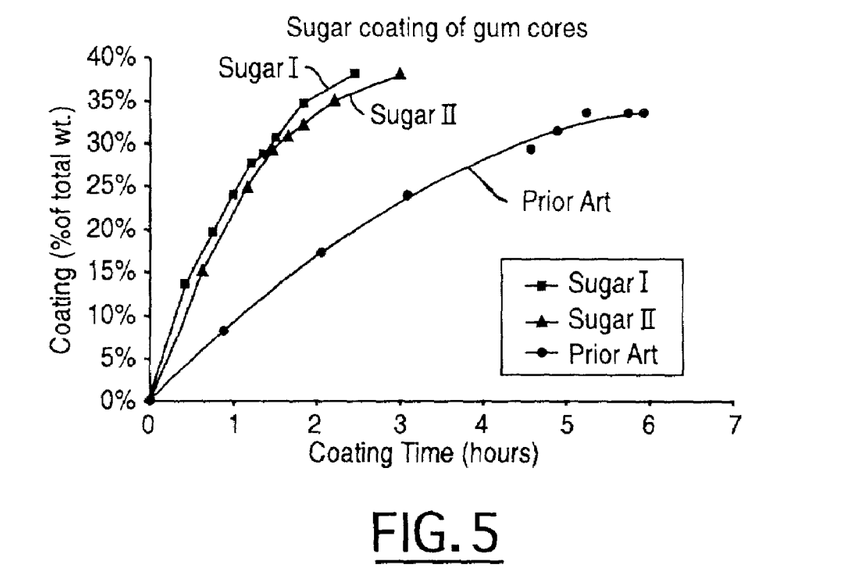
FIG. 5 is a graph illustrating the advantages of the present invention with sugar-based coatings.

The results of the sugar examples I and II compared with conventional coating processes is shown in FIG. 5, the "prior art" process depicted relates to a current Chiclet production by Warner-Lambert and indicates that a coating of about 32-33% by weight of the product takes about six hours to accomplish. With the present invention, however, where the solid concentration of syrup is increased as indicated above, and the sugar solution is heated and maintained at an elevated temperature until it is sprayed, the coating time in order to secure the same resulting product was reduced approximately 50% to under three hours.

These examples show that with the present invention, substantially the same type of sugar coated chewing gum product can be produced in approximately one-half the time and effort. This reduces the overall cost of the product, both in use of the equipment and in labor costs. This also can increase the production volume of the factory since approximately twice the amount of product can be produced in the same amount of time.

The actual number of coatings in order to produce an equivalent product to known processes also can be reduced with the present invention. For example, it is common in known sugar coating processes to repeat the spraying and drying process approximately 30-80 times. With the present invention as shown in FIGS. 3 and 4, only 33-37 repetitions were needed in order to produce a commercially acceptable product.

Figure 6:
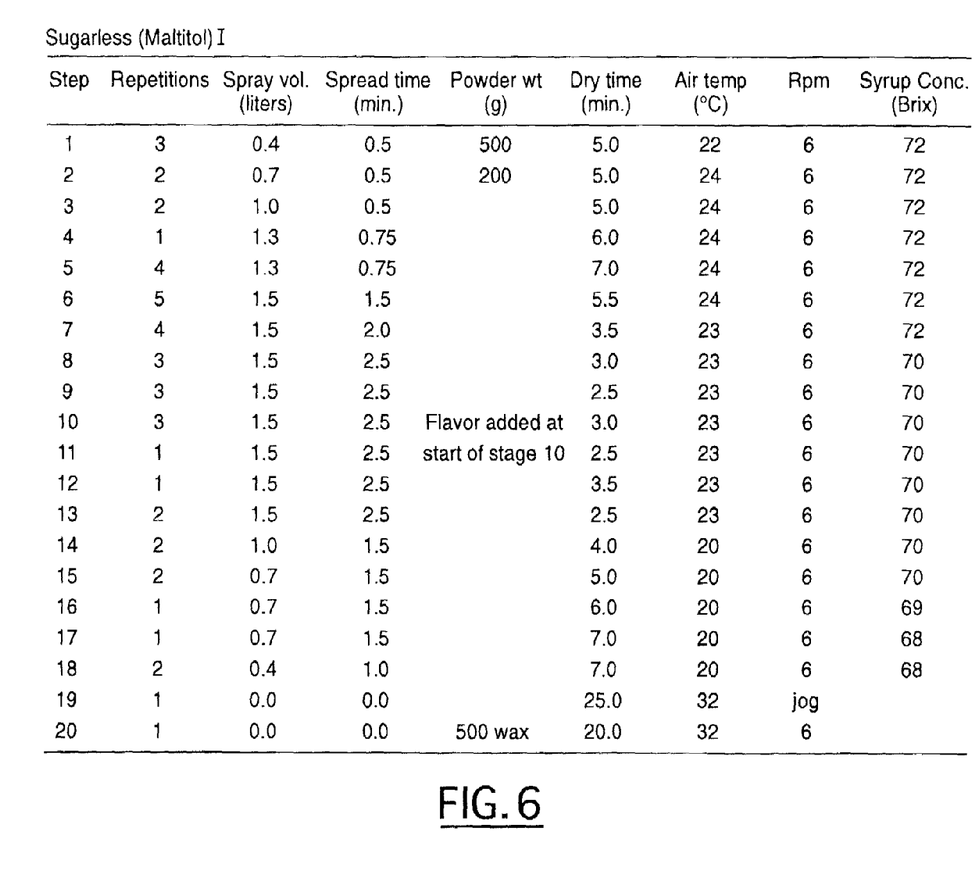
FIG. 6 is a chart or table evidencing an example of a system using an embodiment of the present invention with a sugarless coating.

The results of use of the present invention with sugarless materials is shown in the FIG. 6 chart or table entitled Sugarless (Maltitol) I. In this example, 125 kilogram cores were utilized. The syrup composition was 75 kilograms of Maltitol, 20 kilograms of water, 0.8 kilograms of Titanium Dioxide Slurry (50% w/w) and 14 kilograms of gum arabic solution (28.5% w/w). The same Dumoulin IDA 500X coating pan was utilized as with the two sugar examples described above. In addition, flavor was added at the start of stage 10 in this test.

For the first two stages of the sugarless material, a powder coating was utilized. The powder was utilized to reduce the stickiness and tackiness of the cores and to facilitate separation of the cores in the coating pan. The powder coating also accelerates the crystallization of the syrup when it is applied to the cores. The "seeding" reduces the "tacky time" of the sprayed material.

In the sugarless example, a period spread time was utilized for all of the various stages in order to spread out the syrup on the cores to reduce the roughness of the successive layers. The air temperature for the stages was between 22-24° C. (except for the final two stages where the air temperature was increased to facilitate final drying of the products). This temperature was used to slow the evaporation of water from the syrup spray and thus to slow the crystallization. In the coating process, a balance is desired between fast crystallization of the product in order to speed up the coating process overall, and slower crystallization in order to allow the syrup to spread evenly over the surfaces of the cores. Keeping the temperature constant in the 22-24° C. range provided the requisite balance relative to this example.

The concentration of the sugarless (Maltitol) syrup in stages 1-7 was 72 Brix. The concentration was reduced to 70 Brix starting at stage 8 to smooth out the surface of the coatings. It was later believed that the reduction of the syrup concentration to 70 could have been delayed for many more stages since the surface texture smoothed off very quickly once the 70 Brix was utilized. The addition of the flavor also helped smooth off the surface.

Once the flavor is added, the drying time can be increased since some flavors will take longer to dry than the Maltitol and the sugarless syrup.

In stage 19, the coating pan was changed to a "jog" mode where the products were shaken as well as tumbled. This was used to help dry off the syrup coatings before the application of the final wax polishing coat. The "jogging" mode also helped reduce abrasion and chipping of the products. The final product produced in the sugarless I example was coated and waxed in less than 5.5 hours. The surface texture was smooth and the hardness/crunch was comparable to current products.

Figure 7:
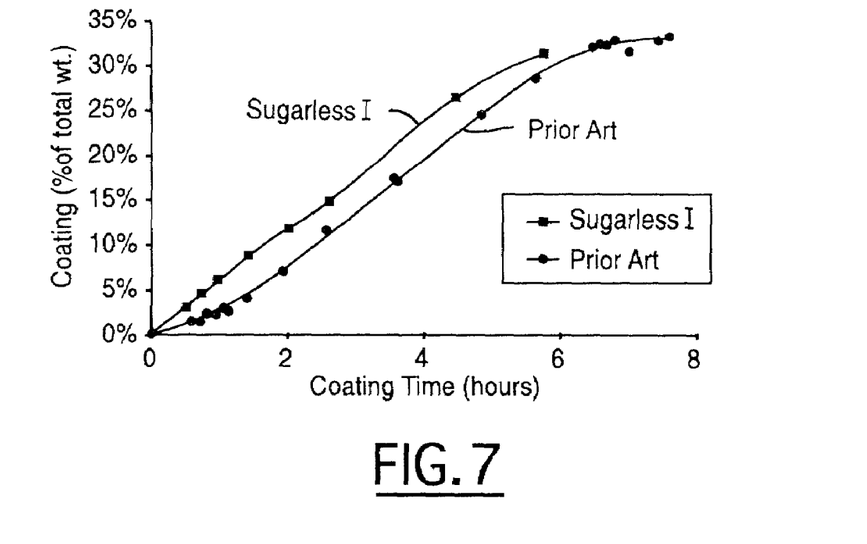
FIG. 7 is a graph illustrating the advantages of the present invention with sugarless coatings.

A comparison of a known sugarless coating process with the coating process of the present invention is shown in FIG. 7. As shown, the prior art process took approximately 7½ hours to achieve a coating weight of approximately 33-34%. In contrast, with the present invention, a sugarless coating of maltitol of the same weight was applied on the gum cores in about 5½ hours.

The present invention also can reduce the number of spraying and drying steps and repetitions over known processes for producing coated sugarless pellet gum products. With the use of maltitol, for example, known processes typically take from 35-100 or more repetitions of spraying and drying in order to achieve a satisfactory product. With the present invention, however, as shown in FIG. 6, only 44 repetitions were needed in order to provide a satisfactory product.

While particular embodiments of the invention have been shown and described, numerous variations and alternative embodiments will occur to those skilled in the art. Accordingly, it is intended that the invention be limited only in terms of the appended claims.

What is claimed is:

1. A method for coating layers of sugar syrup material on pieces of confectionery material to form a, crunch coating, said method comprising the steps of:
    (a) introducing pieces of confectionery material into a coating mechanism;
    (b) forwarding the sugar syrup material from a container housing the sugar syrup material through a conduit to the coating mechanism;
    (c) maintaining the sugar syrup material at an elevated temperature within the container and conduit sufficient to prevent the solids in the sugar syrup material from crystallizing or precipitating out of the sugar syrup material;
    (d) spraying at least one layer of the sugar syrup material on each of said pieces of confectionery material, said sugar syrup material having a concentration of solids in the range of 80-84 Brix.; and
    drying said at least one layer of said sugar syrup material in said coating mechanism virtually instantaneously as said sugar syrup material is sprayed on each of said pieces to form the crunch coating of said sugar syrup material on each of said pieces of confectionery material.

2. The method as set forth in claim 1 wherein said confectionery material is a chewing gum material.

3. The process as set forth in claim 1 wherein said at least one layer of said sugar syrup material is dried by heated air.

4. The method as set forth in claim 1 wherein said coating mechanism comprises a rotating drum member.

5. The method as set forth in claim 1 further comprising spraying at least one layer of a second sugar syrup material on said crunch coating, said second syrup material having a solids concentration of 70-74 Brix and being maintained prior to spraying at an elevated temperature sufficient to prevent the solids from precipitating or crystallizing out of the second syrup material; and drying said at least one layer of the second syrup material to form a coating on said, crunch coating.

6. The method as set forth in claim 1 further comprising applying a finishing coating material to the crunch coating, having a lower Brix value than the sugar syrup material.

7. The method of claim 6 further comprising adding a flavor to the finishing coating.

8. The method of claim 1 wherein the sugar syrup material comprises at least two sugar syrup material portions each having a different Brix value.

9. The method of claim 1 wherein the amount of the coating is from 20-40% by weight of the confectionery material.

10. A method for coating layers of sugarless syrup material on pieces of confectionery material to form a, crunch coating, said method comprising the steps of:
    (a) introducing pieces of confectionery material into a coating mechanism;
    (b) forwarding the sugarless syrup material from a container housing the sugarless syrup material through a conduit to the coating mechanism;
    (c) maintaining the sugarless syrup material at an elevated temperature within the container and conduit sufficient to prevent the solids in the sugarless syrup material from crystallizing or precipitating out of the sugarless syrup material;
    (d) spraying at least one layer of the sugarless syrup material on each of said pieces of confectionery material, said sugarless syrup material having a concentration of solids in the range of 70-74 Brix.; and
    drying said at least one layer of said sugarless syrup material in said coating mechanism virtually instantaneously as said sugar syrup material is sprayed on each of said pieces to form the crunch coating of said sugarless syrup material on each of said pieces of confectionery material.

11. The method as set forth in claim 10 wherein said confectionery material is a chewing gum material.

12. The method as set forth in claim 10 wherein said coating mechanism comprises a rotating drum member.

13. The method as set forth in claim 10 further comprising the step of spraying at least one layer of a powder material on said pieces of confectionery material.

14. The method as set forth in claim 10 further comprising the step of spraying a final finishing layer of a wax material on said pieces of confectionery material.

15. The method as set forth in claim 8 further comprising applying a finishing coating material to the crunch coating, having a lower Brix value than the sugarless syrup material.

16. The method claim 8 wherein the sugarless syrup material comprises at least two sugarless syrup material portions each having a different Brix value.

* * * * *